Oct. 29, 1935.                R. M. RIBLET                2,019,464
                          PINION SHAFT BEARING
                         Filed March 28, 1935
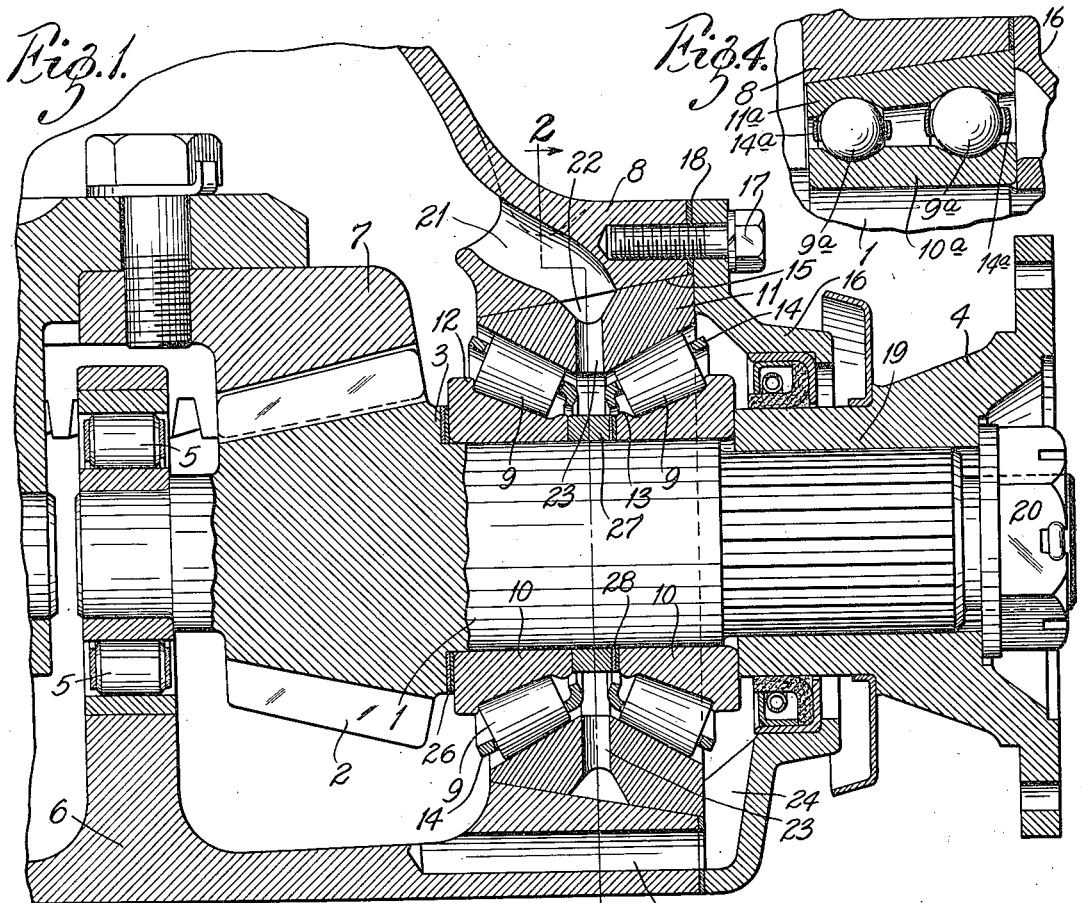
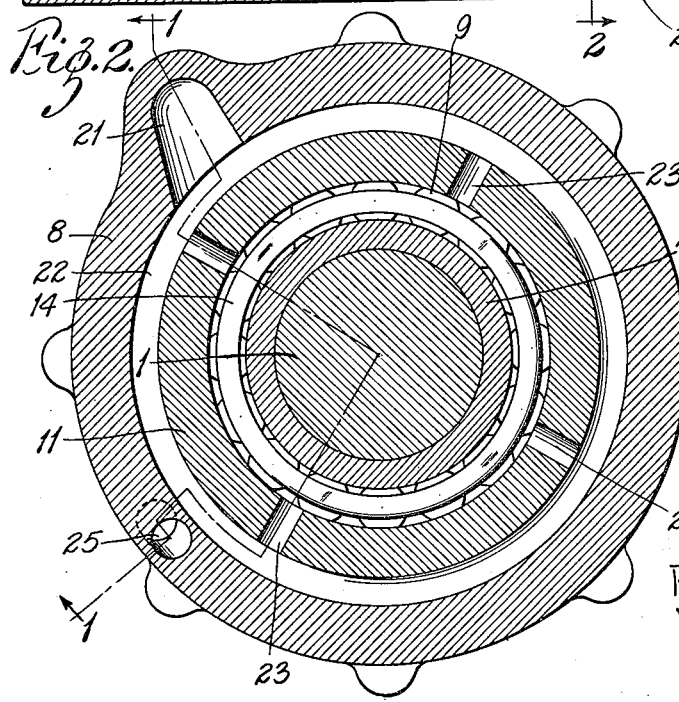
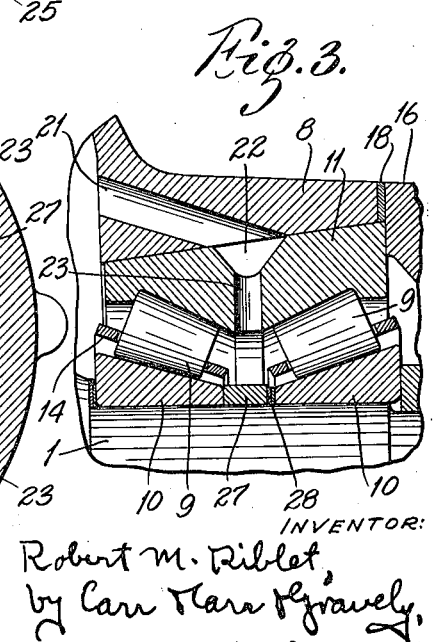
INVENTOR:
Robert M. Riblet,
by Carr Marr & Gravely
HIS ATTORNEYS.

Patented Oct. 29, 1935

2,019,464

UNITED STATES PATENT OFFICE 2,019,464

PINION SHAFT BEARING

Robert M. Riblet, Canton, Ohio, assignor to The Timken Roller Bearing Company, Canton, Ohio, a corporation of Ohio Application March 28, 1935, Serial No. 13,398

5 Claims. (Cl. 74—424)

My invention relates to the mounting of pinion shafts and is especially applicable to the mounting of driving pinion shafts of automotive vehicles. Such shafts are very commonly made with spiral bevel pinions that ought to be accurately enmeshed with the spiral bevel ring gear of the differential mechanism and firmly held against endwise movement in either direction. Heretofore these requirements have involved considerable difficulties and expense.

The principal object of the present invention is to devise a simpler, less expensive and more firmly fixed pinion shaft mounting construction than has heretofore been used and which is adjustable and well adapted for lubrication. The invention consists principally in making the outer raceway member of the bearing of such mounting with a conical outer surface and clamping same against a conical seat therefor. It also consists in the parts and in the arrangements and combinations of parts hereinafter described and claimed.

In the accompanying drawing, which forms part of this specification, and wherein like numerals refer to like parts wherever they occur;

Fig. 1 is a longitudinal sectional view of a portion of an automotive driving axle provided with a pinion shaft mounting embodying my invention, the section being taken on the line 1—1 in Fig. 2;

Fig. 2 is a vertical cross section on the line 2—2 of Fig. 1;

Fig. 3 is a view of a modification wherein the outer raceway member is provided with thrust ribs in lieu of the thrust ribs of the inner raceway member; and Fig. 4 is a view of a modification showing a deep groove type double row ball bearing capable of taking end thrust.

The construction illustrated in the accompanying drawing is a propeller or pinion shaft of an automotive vehicle with other parts closely associated therewith. The pinion shaft 1 has a spiral bevel pinion 2 integral therewith and the face of the hub at the large end of the bevel pinion constitutes a shoulder 3 that extends radially beyond the circumference of the adjacent portion of the shaft. One end of this shaft, hereinafter called the forward end, has a member 4 splined thereon for operatively connecting it to a motor (not shown) to be driven thereby. The other end of the shaft, hereinafter called the rear end, is mounted in a plain, ball or cylindrical roller bearing 5 provided therefor in the differential carrier 6 of the axle housing. The spiral bevel pinion 2 is located close to the rear end of the shaft 1 and meshes with the spiral bevel ring gear 7 of an ordinary differential mechanism (not shown) mounted in the carrier 6. The pinion shaft extends through a nosing 8 on the carrier, and an anti-friction bearing is interposed between the shaft and such nosing of the axle housing.

In the construction illustrated in Fig. 1, the bearing comprises two sets or rows of conical rollers 9 arranged in circular series between inner raceway members 10 mounted on the shaft and an outer raceway member 11 mounted in a seat provided therefor in the housing. The inner raceway members 10 have conical raceway surfaces that taper toward each other and are provided at their large ends with annular thrust ribs or shoulders 12 and are also preferably provided with ribs 13 at the smaller ends of the raceway surface. Cages 14 of any suitable type are used to space the rollers 9 apart and keep them properly assembled on the inner raceway members. The outer raceway member 11 serves both rows of rollers, that is, it has two conical raceways that taper towards each other.

The outer surface of the outer raceway member 11 is of conical form and fits in a conical seat 15 provided therefor in the nosing 8 or other part of the axle housing, said seat tapering rearwardly, that is, inwardly toward the middle of the axle housing. A clamping plate or ring 16, which is secured by screws 17 or otherwise to the housing, bears against the end of the outer raceway member to hold it firmly against its conical seat. Preferably, the end of the outer raceway member projects beyond the forward end of the nosing of the housing and one or more compressible gaskets 18 are interposed between the margin of the plate and the end of said nosing. In this manner, the outer raceway member is rigidly clamped between its conical seat and the clamping plate secured to the end of said nosing.

As stated above, the two inner raceway members are disposed with their small ends toward each other. With this arrangement, the large end of one raceway member, hereinafter called the rear inner raceway member, lies close to the pinion, while the large end of the other raceway member, hereinafter called the forward inner raceway member, is disposed toward the motor. The diameter of the forward part of the shaft is smaller than the portion that constitutes the seat of the inner raceway members and this reduced forward portion extends rearwardly somewhat beyond the front end of the forward inner raceway member. The forward end of the shaft is provided with means for longitudinally adjusting the position of the forward inner raceway member. In the construction shown, such means consists of a sleeve 19 splined or slidably mounted on the reduced portion of the shaft together with a nut 20 which works on a thread provided therefor on the forward end of said shaft. By this arrangement the sleeve constitutes an adjustable abutment against which the forward inner raceway member bears when said raceway member is subjected to thrust in a forward direction.

In order to provide for lubrication of the bearing, the nosing is provided with a passageway 21 in its upper portion in position to receive oil that is flung off from the ring gear. This passageway opens through the seat of the outer raceway member and said member is provided with an annular groove 22 wide enough to register with said passageway throughout a reasonable range of axial adjustment of said member. Said member is also provided with passageways 23 extending through it from said groove to the space between the small ends of the rollers. The rear half of the bearing drains directly into the axle housing; and the front half drains into said housing through a radially disposed groove 24 in the flat face of the clamping plate, which groove communicates with a passageway 25 that extends through the bottom of the nosing and opens into said housing. In the practical work of assembling the pinion shaft mounting to obtain the proper depth of enmeshment of the pinion 2 and the ring gear 7, the outer raceway member 11 is clamped in its conical seat 15 by means of the end plate 16 and the rear inner raceway member, together with its rollers, is mounted in said outer raceway member. The distance from the rear end of the rear inner raceway member to a predetermined point on the cross bore of the differential mechanism (not shown) and the distance from the shoulder 3 of the properly meshed pinion to said predetermined point are then measured. The difference between these two measurements shows the thickness of shims required to properly mesh the pinion and gear and to properly locate the rear bearing. Shims 26, preferably in the form of split rings of a total thickness equal to said difference, are then interposed between the pinion shoulder 3 and the end of the rear inner raceway member.

The correct position of the forward inner raceway member is then readily ascertained and shims or spacing members of the proper total width are interposed between adjacent ends of the inner raceway member to keep them properly spaced. In the drawing, such spacing members are shown in the form of one wide ring 27 and a plurality of thin ring shims 28.

The arrangement above described enables the pinion to be positioned very accurately with respect to the ring gear and the bearing and enables the parts of the bearings to be very accurately adjusted with respect to one another. In addition to radial load, the bearing takes care of end thrust in both directions with substantially no endwise play. As the conical outer surface of the outer raceway member is mounted in a conical seat in the nosing and is clamped therein by an end plate that is secured directly to the nosing, the construction is simple, strong and rigid. Such construction is also easy to make and fit with precision and dispenses with the need for a special shoulder of the kind commonly used on pinion shaft supports. It also has the special merit that it requires very little force to separate the outer raceway member from its seat in comparison with the force required to remove a well-fitting cylindrical member. As the end of the outer raceway member extends beyond the nosing, it is feasible to make the clamping ring with a plain flat face, as distinguished from the ribs or other special devices heretofore used in this connection.

In the construction hereinbefore described, thrust ribs for the rollers are located on the inner raceway members. In the modification illustrated in Fig. 3 the thrust ribs are located on the larger end of the outer raceway member. In other respects, the construction illustrated in Fig. 2 is similar to that of Fig. 1.

In the modification shown in Fig. 4, the pinion shaft bearing is a double row ball bearing comprising two sets of balls 9a held in cage 14a between a unitary two-raced inner raceway member 10a mounted on said shaft and a unitary two-raced outer raceway member 11a of conical form mounted in the conical seat provided therefor in the nosing 8. In this double row ball bearing construction, the ball races are in the form of relatively deep grooves, whereby the bearing is capable of resisting considerable end thrust in both directions in addition to carrying the radial load.

While I have described my invention as embodied in a pinion shaft with an ordinary spiral bevel gear, it is applicable to other shafts that are subject to end thrust and I do not wish to be restricted to such bevel gear construction. For instance, instead of being equipped with the conventional spiral bevel gear, the shaft might be equipped with an ordinary bevel gear or with a hypoid gear or with a worm gear. Likewise, while I have described my invention as embodied in bearings having two rows of rollers and balls, it is obviously applicable also to bearings with a single row of rollers or balls. The rollers may be of any type that are suited to take care of both radial and axial load.

What I claim is:

1. The combination of a shaft having a pinion thereon, a support having a bearing seat forward of said pinion and a conical bearing seat rearward of said pinion, a cylindrical bearing interposed between said shaft and said support with a cylindrical outer raceway member mounted in said first mentioned seat, a taper roller bearing interposed between said shaft and said support and comprising separate inner raceway members on the shaft tapering toward each other, an outer raceway member with a conical outer surface mounted in said conical bearing seat and comprising two conical raceways tapering toward each other and taper rollers between said raceway members, an end plate secured to said support and against said outer raceway member, means on the shaft for positioning the inner raceway member furthest from the pinion, and spacing members interposed between the pinion and the adjacent inner raceway member.

2. The combination of a shaft having a pinion thereon, a support having a bearing seat forward of said pinion and a conical bearing seat rearward of said pinion, a cylindrical bearing interposed between said shaft and said support with a cylindrical outer raceway member mounted in said first mentioned seat, a taper roller bearing interposed between said shaft and said support and comprising separate inner raceway members on the shaft tapering toward each other, an outer raceway member with a conical outer surface mounted in said seat and comprising two conical raceways tapering toward each other and taper rollers between said raceway members, an end plate secured to said support opposite said outer raceway member and constituting an abutment therefor, means on the shaft for preventing endwise movement of the inner raceway member furthest from the pinion, and spacing members interposed between the pinion and the adjacent inner raceway member and between the two raceway members.

3. In an automotive axle construction, the combination of an axle housing having a nosing constituting a part thereof, a differential mechanism therein having a bevel gear, and a propeller shaft extending through said nosing and having a bevel pinion meshing with said bevel gear, said nosing having an inwardly tapering conical seat formed therein, an outer raceway member with an outer conical surface fitting in said seat, means for clamping said member endwise against said seat, inner raceway members on said shaft, rollers between the inner and outer raceway members, shims interposed between a shoulder on the rear portion of said shaft and the adjacent inner raceway member, spacing means between the inner raceway members, and means on the forward portion of the shaft for positioning the forward inner raceway member.

4. The combination of an axle housing having a nosing constituting part thereof, a differential mechanism therein having a bevel gear, a shaft having a pinion thereon meshing with said gear, said nosing having a conical seat formed therein, a taper roller bearing interposed between said shaft and said support and comprising separate inner raceway members on the shaft with their raceway surfaces tapering toward each other, a single outer raceway member with a conical outer surface mounted in said seat with its end projecting therefrom and comprising two conical raceways tapering toward each other and taper rollers between said raceway members, an end plate secured to said nosing opposite said outer raceway member and constituting an abutment therefor, means on the shaft for preventing endwise movement of the inner raceway member furthest from the pinion, and spacing members interposed between the pinion and the adjacent inner raceway member and between the two inner raceway members, said outer raceway member having a radial passageway located between said inner raceway members, and an annular groove in its outer surface communicating with said passageway and with a source of lubricant supply.

5. The combination of an axle housing having a nosing constituting part thereof, a differential mechanism therein having a bevel gear, a shaft having a pinion thereon meshing with said gear, said nosing having a bearing seat forward of said pinion and a conical bearing seat rearward of said pinion, a cylindrical bearing interposed between said shaft and said support with a cylindrical outer raceway member mounted in said first mentioned seat formed therein, a taper roller bearing interposed between said shaft and said support and comprising separate inner raceway members on the shaft with their raceway surfaces tapering toward each other, a single outer raceway member with a conical outer surface mounted in said conical seat with its end projecting therefrom and comprising two conical raceways tapering toward each other and taper rollers between said raceway members, an end plate secured to said nosing opposite said outer raceway member and constituting an abutment therefor, means on the shaft for preventing endwise movement of the inner raceway member furthest from the pinion, and spacing members interposed between the pinion and the adjacent inner raceway member and between the two inner raceway members, said outer raceway member having a radial passageway located between said inner raceway members, and an annular groove in its outer surface communicating with said passageway and with a source of lubricant supply.

ROBERT M. RIBLET.